H. H. FLANDERS.
GAGE.
APPLICATION FILED JAN. 17, 1919.
1,331,190.
Patented Feb. 17, 1920.
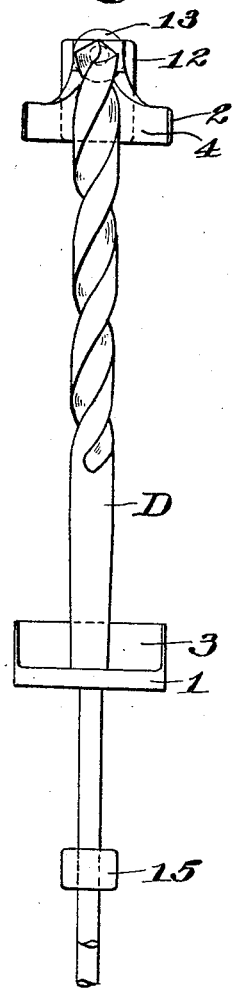
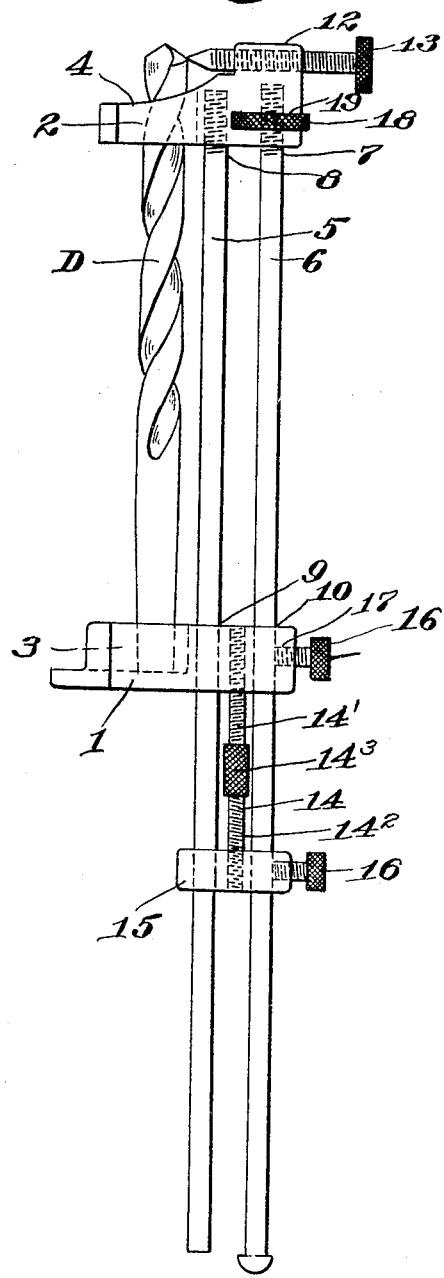
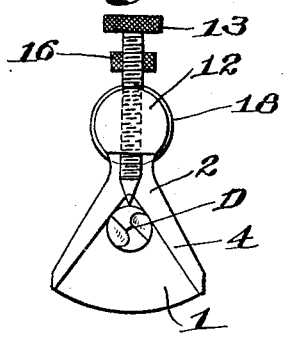
Inventor
Henry H. Flanders
by Ellis Spear Jr.
Attorney

UNITED STATES PATENT OFFICE.

HENRY H. FLANDERS, OF NEWTON, MASSACHUSETTS.

GAGE.

1,331,190.    Specification of Letters Patent.    Patented Feb. 17, 1920.

Application filed January 17, 1919. Serial No. 271,692.

*To all whom it may concern:*

Be it known that I, HENRY H. FLANDERS, a citizen of the United States, residing at Newton, county of Middlesex, Commonwealth of Massachusetts, have invented certain new and useful Improvements in Gages, of which the following is a specification.

This invention relates to improvements in gages for testing drills and the like, particularly after they have been reground, in order to ascertain whether or not the drill point has been ground perfectly true.

In the sharpening of such a tool as a drill, it is of the utmost importance that the cutting edges shall all be of the same angle and length with relation to the longitudinal axis or dead center line of the drill. Failure to properly grind the drill point not only reduces the efficiency of the drill as a cutting tool but frequently causes the drill to break in use. Heretofore, so far as I am aware, drills have been tested for accuracy after grinding mainly by eye. This of course precludes anything like true accuracy of result.

It is therefore the object of my invention to provide a gage for testing drills, which while simple and inexpensive of construction, will accurately indicate whether or not the cutting edges are uniformly ground to the proper angle and length. This object, together with certain other features of advantage which will appear more fully hereinafter are secured in the device of the present invention.

The construction and operation of my present invention, together with a selected embodiment which well illustrates the principles involved and which have been found satisfactory in use, are disclosed in the specification which follows, illustrated in the accompanying drawings, and particularly pointed out in the appended claims.

Throughout the specification and drawings like reference characters are correspondingly employed, and in the drawings:

Figure 1 is an elevation of a gage in accordance with my invention and showing a drill in position for gaging.

Fig. 2 is a side view at substantially right angles to Fig. 1, and

Fig. 3 is a plan view.

For the purpose of this application, I have illustrated my gage in its application to the testing of a twist drill. This selection is purely illustrative however, and it will be understood that the gage may be used in the testing of other tools of corresponding nature.

My gage comprises a pair of drill supporting members 1 and 2. The member 1 is provided with a V-shaped notch 3 in which the butt end of a drill D is centered. The member 2 has an open fork 4 of the same angularity as the V-shaped notch 3 in which the forward end of a drill near its point is centered. The members 1 and 2 are adjustably supported and guided for relative spacing with their forks in continuous parallelism. To this end, two guide rods 5 and 6 are tapped into the member 2, as at 7 and 8, and freely pass through bearings 9 and 10 in the member 1, except when said member 1 is locked on one of the rods, here shown as rod 6, to prevent relative movement.

The member 2 is shouldered at 12 so that the fork 4 is at one side exposing the point of the drill D to a pointed gage screw 13 threaded through the member 1 in the plane vertically dividing the alined angles of the supporting members 3 and 4.

A drill to be tested is laid in the angles of the supports 3 and 4 its butt contacting with the web $3^1$ which closes the otherwise forked portion of the member 1. The member 1 is then adjusted along the guiding means relative to the member 2 until the point of the drill is brought into proper relation to the line of the gage element 13.

As here shown, this adjustment is had through a threaded stem 14, clamp bearing 15, and clamping screws 16. The bearing 15 is slidably mounted on the guide rods 5 and 6, preferably below the butt end support 1 and both it and said member 1 are tapped to receive the oppositely threaded portions $14^1$ and $14^2$ of the stem 14.

For compactness of structure, the stem 14 is disposed between the guide rods 5 and 6, and preferably has an enlargement $14^3$ that is milled or otherwise roughened, separating the oppositely threaded portions $14^1$ and $14^2$ and providing a convenient operating portion for rotating the stem 14 in either direction.

The rough adjustment of the parts is had through loosening the clamping screw 16 from its engagement with the guide rod 6, and sliding the member 1, and with it the bearing 15 toward or from the member 2 until the drill point is approximately correctly positioned with relation to the line of the pointed gage screw 13. The clamping screw 16 is then tightened to hold this adjustment after which the butt support 1 is adjusted relative to the member 2, and to the bearing 15, by means of the threaded stem 14 to obtain the fine adjustment of the parts. The point of the gage screw 13 is then brought into exact contact with the drill point upon rotation of the drill.

Where desired, the threaded stem 14 and bearing 15 may be omitted, and relative adjustment of the members 1 and 2 may be had as follows. Member 1 may have a hole 17 tapped therethrough into which the clamp screw 16 threads to engage the guide rod 6 and hold the adjustment of said member. By loosening this screw, member 1 may be slid along its guide to obtain the rough adjustment, this adjustment being held by the screw. The fine adjustment of the parts may be had by adjusting the member 2, and with it gage screw 13, toward or away from member 1. The means for permitting this adjustment, as here shown, consists of a milled adjusting nut 18 mounted on the threaded portion 7 of the guide rod 6 and operating in a kerf 19 formed in the shouldered portion of the member 2.

Various other modifications in the structure and arrangement of parts may obviously be made all without departing from the spirit of my invention if within the limits of the appended claims.

What I therefore claim and desire to secure by Letters Patent is:

1. A gage of the class described comprising a pair of forked members, the furcations of the members being at the same angle, means whereby the forked members are adjustably supported and guided for relative spacing with their forks in continuous parallelism, a gage point adjustable in the plane bisecting the angles of the forks of said members, means for permitting and for holding the rough adjustment of one of said members relative to the other, and means for permitting and for holding the fine adjustment of one of said members relative to the other.

2. A gage of the class described comprising guiding means, a pair of forked members, the furcations of the members being at the same angle, mounted thereon for adjustment relative to each other while maintained in parallelism, an adjustable gage point movably mounted in the plane bisecting the angles of the forks of said members, and adjacent one of said forked members, a butt stop adjacent the fork of the other of said members, means for permitting and for holding the rough adjustment of one of said members relative to the other, and means for permitting and for holding the fine adjustment of one of said members relative to the other.

3. In a gage, guiding means, a pair of spaced members, having forks, the furcations of the members being at the same angle, and adjustable thereon, a gage point adjustable transversely of one of said forks, means for permitting and for holding the rough adjustment of one of said members relative to the other, and means for permitting and for holding the fine adjustment of one of said members relative to the other.

4. In a gage, guiding means, a pair of forked members adjustable thereon, one of said members having a relatively flat tool supporting portion for supporting a tool to be gaged with the tool between the forks of said members, a gage element adjustably mounted upon the other forked member, means for permitting and for holding the rough adjustment of one of said members relative to the other, and means for permitting and for holding the fine adjustment of one of said members relative to the other.

5. In a gage, a guide, a tool support and a gage block adjustable thereon relative to each other, said gage block being forked and adapted to receive between its forks a tool supported upon said tool support, a gage element adjustable in the plane bisecting the angle of said forks, means for permitting and for holding the rough adjustment of one of said members relative to the other, and means for permitting and for holding the fine adjustment of one of said members relative to the other.

6. In a gage, a pair of spaced relatively adjustable members having forks between which a tool to be gaged is adapted to be centered, a gage element adjustable transversely of one of said forks, means for permitting and for holding the rough adjustment of one of said forked members relative to the other, and a threaded element for permitting and for holding the fine adjustment of one of said forked members relative to the other.

7. In a gage, a guide, a pair of spaced members adjustable thereon having forks between which a tool to be gaged is adapted to be centered, a gage point adjustable transversely of one of said forks, a clamping screw coöperating with said guide for permitting and for holding the rough adjustment of one said forked members relative to the other, and a threaded element coöperating with one of said forked members for permitting and for holding the fine adjustment of said member relative to the other member.

8. In a gage, a pair of spaced parallel guides, a tool supporting member and a gage carrying member adjustable thereon, a gage element carried by said gage carrying member, a bearing slidably mounted upon said guides, and a stem disposed between said guides and having oppositely threaded portions engaging said bearing and the said tool supporting member, respectively, for adjusting said tool supporting member relative to said gage carrying member.

9. A gage of the class described comprising a pair of forked members of equal angularity, means whereby the forked members are supported and guided for relative spacing with their forks in continuous parallelism, and a gage point adjustable in the plane dividing the angles of the forks of said members.

10. A gage of the class described comprising guiding means, a pair of forked members of equal angularity mounted thereon for adjustment relative to each other while maintained in parallelism, and an adjustable gage point movably mounted in the plane dividing the angles of the forks of said members, and adjacent one of said forked members, and a butt stop adjacent the fork of the other of said members.

11. In a gage, guiding means, a pair of spaced members having forks of equal angularity adjustable thereon, and a gage point adjustable transversely of one of said forks.

12. In a gage, guiding means, a pair of forked members adjustable thereon, one of said members having a relatively flat tool supporting portion for centering a tool to be gaged between the forks of said members, and a gage element adjustably mounted upon the other forked member.

13. In a gage, a guide rod, a tool support and a gage block adjustable thereon relative to each other, said gage block being forked and adapted to receive between its forks a tool supported upon said tool support, and a gage element adjustable in the plane dividing the angle of said forks.

In testimony whereof I affix my signature in presence of two witnesses.

HENRY H. FLANDERS.

Witnesses:
LEON C. GUPTILL,
GEO. B. RAWLINGS.